(12) United States Patent
Chang (10) Patent No.: US 9,467,886 B2
(45) Date of Patent: Oct. 11, 2016

(54) CROSS-RAT CONFIGURATION FOR MINIMIZATION OF DRIVE TEST

(75) Inventor: Henry Chang, San Diego, CA (US)

(73) Assignee: Kyocera Corporation, Kyoto (JP)

(*) Notice: Subject to any disclaimer, the term of this patent is extended or adjusted under 35 U.S.C. 154(b) by 551 days.

(21) Appl. No.: 13/821,908

(22) PCT Filed: Sep. 24, 2010

(86) PCT No.: PCT/US2010/050309
§ 371 (c)(1),
(2), (4) Date: Mar. 8, 2013

(87) PCT Pub. No.: WO2012/039722
PCT Pub. Date: Mar. 29, 2012

(65) Prior Publication Data
US 2013/0176884 A1    Jul. 11, 2013

(51) Int. Cl.
| | |
|---|---|
| *H04L 12/28* | (2006.01) |
| *H04W 24/10* | (2009.01) |
| *H04J 1/16* | (2006.01) |
| *H04W 24/08* | (2009.01) |
| *H04W 28/18* | (2009.01) |
| *H04W 48/08* | (2009.01) |
| *H04W 88/06* | (2009.01) |

(52) U.S. Cl.
CPC .............. *H04W 24/10* (2013.01); *H04W 24/08* (2013.01); *H04W 28/18* (2013.01); *H04W 48/08* (2013.01); *H04W 88/06* (2013.01)

(58) Field of Classification Search
USPC ........................................ 370/252, 329, 339
See application file for complete search history.

(56) References Cited

U.S. PATENT DOCUMENTS

| | | | |
|---|---|---|---|
| 8,868,063 B2* | 10/2014 | Wang et al. ................... 455/423 |
| 2007/0037594 A1* | 2/2007 | Palenius et al. .............. 455/502 |
| 2009/0233600 A1* | 9/2009 | Johansson ............. H04W 36/14 455/435.2 |
| 2010/0278142 A1* | 11/2010 | Dwyer .............. H04W 36/0083 370/331 |
| 2011/0014919 A1* | 1/2011 | Otte ................... H04W 36/0061 455/442 |
| 2011/0195714 A1* | 8/2011 | Sawinathan ........ H04W 60/005 455/435.1 |
| 2011/0201279 A1* | 8/2011 | Suzuki .................. H04W 24/10 455/67.11 |
| 2012/0064884 A1* | 3/2012 | Ramachandran ... H04W 76/027 455/422.1 |
| 2015/0055625 A1* | 2/2015 | Burbidge .......... H04W 36/0022 370/331 |

FOREIGN PATENT DOCUMENTS

WO      2010087625 A2     8/2010

OTHER PUBLICATIONS

"Digital cellular telecommunications system (Phase 2+); Universal Mobile Telecommunications System (UMTS); LTE; Circuit Switched (CS) fallback in Evolved Packet System (EPS); Stage 2 (3GPP TS 23.272 version 8.4.0 Release 8)", Technical Specification, European Telecommunications Standards Institute (ETSI), France, No. V8.4.0, Jun. 1, 2009.

(Continued)

*Primary Examiner* — John Pezzlo (57) ABSTRACT

Systems and methods for configuring cross radio access technology minimization of drive testing are presented. In one embodiment, the use of circuit switched fallback is used as a trigger for switching minimization of drive test configurations on a user equipment. After the user equipment returns from circuit switched fallback, the minimization of drive test parameters are reported to the base station.

20 Claims, 3 Drawing Sheets

(56) References Cited

OTHER PUBLICATIONS

Kyocera: "Inter-RAT MDT data retrieval and MDT (re)-configuration", 3GPP Draft; R2-104813, 3rd Generation Partnership Project (3GPP), Mobile Competence Centre; France vol. RAN WG2, no. Madrid, Spain; Aug. 17, 2010.
"3rd Generation Partnership Project; Technical Specification Group TSG RUNUniveral Terrestrial Radio Access (UTRA) and Evolved Universal Terrestrial Radio Access (E-UTRA); Radio measurement collection for Minimization of Drive Tests (MDT); Overall description; Stage 2 (Release 10)", 3GPP Draft; 37320-100, 3rd Generation Partnership Project (3GPP), Mobile Competence Centre; France vol. RAN WG2, no. Madrid, Spain, Sep. 3, 2010.
Non-Final Office Action dated Mar. 11, 2014 issued by the Japanese Patent Office for Japanese Patent Application No. 2013-530124.

* cited by examiner

CROSS-RAT CONFIGURATION FOR MINIMIZATION OF DRIVE TEST

FIELD OF THE INVENTION

The invention relates generally to wireless communication networks. In one embodiment, the invention relates to systems and methods for measuring coverage characteristics in wireless communication networks.

RELATED ART

When new base stations, also referred to as NodeBs or eNodeBs or cells, are deployed, drive tests can be performed before and after service activation of the new cell. Drive test traditionally include having technicians navigate, or drive, through the coverage area of the new base station and nearby base stations in order to perform measurements using network operator measurement devices. For example, initial downlink/uplink ("DL/UL") coverage measurements of the new cell and neighbor cells can be made. During this drive test phase, initial area tuning can be performed (e.g. selection of an appropriate antenna for the new cell, adjustment of antenna tilting of the new cell and neighbor cells, etc.). Service with the new cell will be started after such initial tuning. In general, drive tests are performed to collect extensive data of DL/UL coverage measurements in the intended area to make sure good DL/UL coverage is being provided.

One alternative to traditional drive tests is a scheme known as minimization of drive test ("MDT"). One motivation of MDT is to reduce the rigorous drive tests that are needed to collect downlink/uplink coverage measurements. With MDT, measurements can be collected from a user equipment ("UE") located in the new cell and in neighboring cells. Advantageously, a large number of UEs present in the relevant areas can be used rather than a relatively small number of network operator measurement devices used in traditional drive tests. This can speed up the optimization cycle and increase customer satisfaction. Further, by using the UEs already in the desired cells, the use of extensive drive tests can be reduced. This reduction in drive tests can reduce network maintenance costs for operators and help to reduce the carbon emission generated from the extra driving to protect the environment. Furthermore, MDT allows operators to collect measurements from areas which are not accessible for drive tests (e.g. narrow roads, forests, private land/house/office). Other advantages of MDT include increased mobility, capacity, and quality of service ("QoS") optimizations.

In order to collect measurements from the UE, the UE must be configured with MDT parameters, e.g., what parameters to measure, how long the measurements should last, and what parameters to report. The MDT parameters can be specific to a particular radio access technology ("RAT"). Under some implementations, a UE, at any one time, is allowed only a single set of MDT parameters corresponding to a single RAT. Thus, the network decides which RAT the UE should use for performing MDT measurements at any given time.

Some RATs may not support MDT. For example, a new cell using a first RAT may support MDT but the neighboring legacy cells using a second RAT may not support MDT. However, it may be desirable to collect MDT measurements from the cells using the second RAT that does not support MDT. One solution to this problem is to perform cross-RAT MDT. In cross-RAT MDT, a multi-RAT UE that is capable of using both the first and second RATs is used to perform MDT measurements for both RATs. For example, the new cell using the first RAT can, at different times, provide different sets of MDT parameters to the multi-RAT UE corresponding to the two RATs belonging to the same operator. If the multi-RAT UE needs to collect measurements from the second RAT when it is currently configured to collect measurements from the first RAT, the new cell would configure the multi-RAT UE with the MDT configuration belonging to RAT B and terminate the existing RAT A MDT configuration.

One problem with cross-RAT MDT is that the network operator of the new cell does not necessarily know when the multi-RAT UE will transition from the first RAT to the second RAT. Thus, it is difficult for the network operator to figure out when to reconfigure the multi-RAT UE with the second RAT MDT configuration and terminate the first RAT MDT configuration.

Therefore, what is needed is a system and method that overcomes these significant problems found in the conventional systems as described above.

SUMMARY

In one aspect, circuit switched fallback ("CSFB") can used as a trigger to determine when a multi-RAT UE will transition between RATs so that cross-RAT MDT can be performed. Thus, for example, when a multi-RAT UE decides to initiate a voice call (or when it receives a voice call) while communicating using an MDT supporting, packet switched RAT, such as long term evolution ("LTE"), the multi-RAT UE may fall back to a non-MDT supporting, circuit-switched RAT (e.g., GSM, 1×RTT) to complete the voice call. When CSFB is activated the packet switched RAT network can configure the multi-RAT UE with MDT configuration parameters for the circuit switched RAT. When the multi-RAT UE completes the voice call and returns to the packet switched RAT, it can report back the MDT measurements that were logged while it used the circuit switched RAT.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for cross-RAT MDT. In particular, systems and methods for triggering cross-RAT MDT are disclosed. For example, one method as disclosed herein allows for triggering cross-RAT MDT based on circuit switched fallback. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1A:
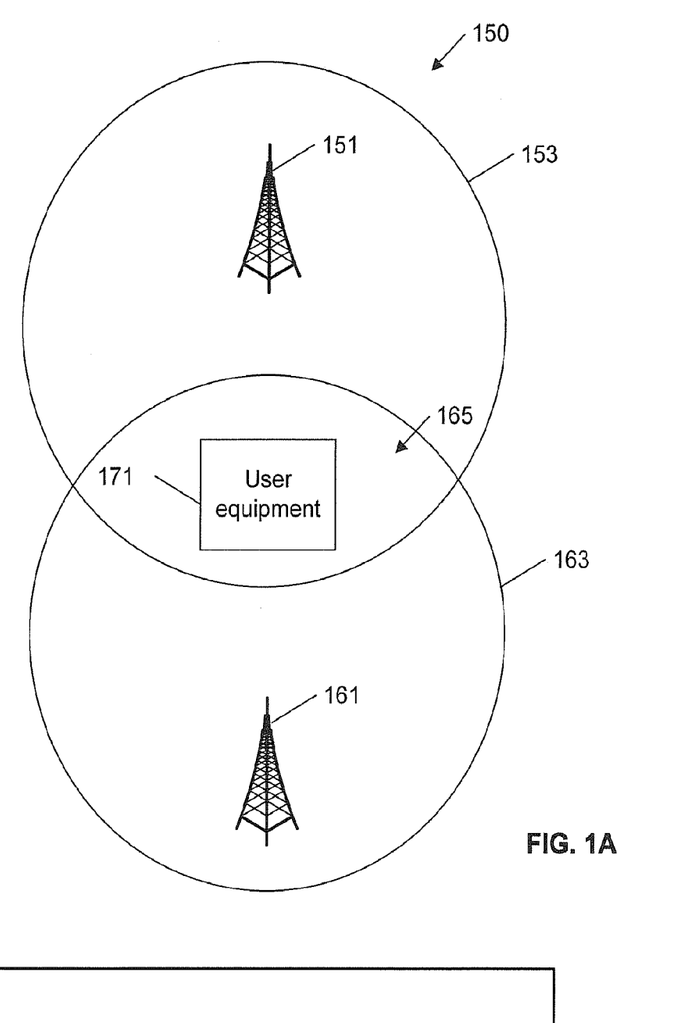
FIG. 1A is a functional block diagram illustrating an example wireless communication network that may be used in conjunction with various embodiments described herein.

FIG. 1A is a functional block diagram illustrating an example wireless communication network 150 that may be used in conjunction with various embodiments described herein. The network 150 comprises a first base station 151, a first coverage area 153, a second base station 161, a second coverage area 163, an overlap in coverage areas 165, and user equipment 171. The base station 151 provides wireless communication coverage to the UE 171 over the coverage area 153. The base station 151 and the coverage area 153 may also be referred to as a cell. Wireless communications received by the base station 151 from the UE 171 may be transmitted via a backhaul network to a network operator's core network (not shown). Similarly, communications may be received by the base station 151 from the core network and transmitted to the UE 171 in the-coverage area 153.

The base station 161 also provides wireless communication coverage to the UE 171. However, the base station 161 provides coverage in the area 163. Wireless communications received by the base station 161 from the UE 171 may be transmitted via a backhaul network to a network operator's core network (not shown). Similarly, communications may be received by the base station 161 from the core network and transmitted to the UE 171 in the coverage area 163.

In one embodiment, the base stations 151 and 161 provide communication coverage using particular radio access technologies ("RATs"). In general, a RAT is a collection of one or more communication or hardware protocols that facilitates wireless communication. For example, RATs may include, but are not limited to GSM, UMTS, LTE, and CDMA. For ease of reference, certain RATs may be described herein as circuit switched ("CS") RATs. These CS RATs may include, for example, GSM, UMTS, and CDMA. Generally, CS RATs are RATs that allocate some fixed portion of communication resources, e.g., recurring time slot or frequency, for reliable use by a user during communication. In contrast, other RATs may be referred to as Internet protocol multimedia subsystem ("IMS") or packet switched ("PS") RATs. These PS RATs may include, for example, LTE. Generally, PS RATs do not allocate fixed portions of resources to users during communication. Rather, data is grouped and routed as packets.

In one embodiment, the base station 151 uses a PS RAT, e.g., LTE, to provide communication for, and to communicate with, the UE 171. Further, the PS RAT supports MDT as described above. However, the base station 161 uses a CS RAT, e.g., UMTS, to communicate with the UE 171 that does not support MDT. It will be appreciated that support for MDT does not depend on whether or not a CS or PS RAT is used. Rather, each RAT may or may not implement MDT. Further, different revisions of each RAT may or may not implement MDT. Thus, for example, UMTS and LTE base stations that implement 3GPP release 10 may implement MDT. Other base stations using the same RATs implementing previous releases may not.

Returning to the embodiment illustrated in FIG. 1A, the UE 171 is a multi-RAT UE capable of communicating with the different base stations 151 and 161 using different RATs. Further, the UE 171 supports MDT. A network operator of the base station 151 may wish to use the UE 171 to perform MDT in the coverage area 153 in order to measure parameters associated with the base station 151. However, the network operator may also wish to perform cross-RAT MDT using the UE 171 to measure parameters associated with the base station 161 in the overlap area 165. The network operator can configure the UE 171 to measure MDT parameters associated with the base station 161 in the overlap area 165 using cross-RAT MDT. However, it may be difficult for the network operator to determine the appropriate time during which the MDT configuration associated the base station 161 should be used. For example, if the network operator configures the UE 171 with the MDT configuration corresponding to the CS RAT of base station 161 while the UE 171 is in communication with the base station 151 network, there is no guarantee that the UE 171 will ever switch to the network of the base station 161 and thus be able to measure the cross-RAT MDT parameters.

Advantageously, as described herein, initiation of circuit switched fall back ("CSFB") may be used as a trigger for cross-RAT MDT configuration. Generally speaking, CSFB is a process by which a wireless device, e.g., the UE 171, switches from a PS RAT to a CS RAT in order to place or take a voice call. For example, in the embodiment illustrated in FIG. 1A, using CSFB means that the multi-RAT UE 171 will switch from communicating with the base station 151 using a PS RAT to communicating with the base station 161 using a CS RAT. In response to this switch, the network operator can configure the UE 171 with an MDT configuration corresponding to the base station 161 and its RAT. When the UE 171 returns to base station 151 after completing the CSFB call, the UE can report back the cross-RAT MDT measurements from the base station 161 to the network operator. In this manner, the network operator can gather important information relating to communication coverage collected from the base station 161. Advantageously, by using CSFB as a trigger for cross-RAT MDT, the network operator can reliably obtain MDT measurements for RATs that do not support MDT.

In general, MDT can include a configuration process, a measurement process, and a reporting process as described herein. It will be appreciated that the term MDT configuration refers to the measurements to be logged for a given RAT. In one embodiment, MDT configurations can be sent to the UE using dedicated signaling as opposed to broadcast signaling. Each UE can be configured differently depending on its capability. The MDT configuration can specify the type of information to be measured such as the received power of the reference signal (e.g., RSRP or Reference Signal Received Power for LTE), the quality of the reference signal (e.g., RSRQ or Reference Signal Received Quality for LTE), both RSCP and Ec/No for UMTS, Rxlev for GSM/GPRS, Received Ec/Io and Rx power for CDMA. The MDT configuration can also specify the cell(s) where the UE should perform the measurements and the total duration that the MDT configuration remains valid. After the UE is configured with the MDT configuration, it will carry out the measurements according to the MDT configuration for the time duration specified and under the specified RAT. In one embodiment, the UE can report the contents of the logged MDT measurement to the network at any time when the UE is connected to the base station. In addition to the measurement parameters specified in the MDT configuration, the MDT report may also include, an indication of the RAT used, success rate of access attempts, paging failures, timestamp information for the measurements, location stamp information for the measurements, or other information. At present, 3GPP standards specify that each UE may only have one RAT specific MDT configuration at a time. If multiple MDT configurations for various RATs were usable, the problem of timing the switch between MDT configurations would be alleviated. However, while limited to a single RAT specific MDT configuration, the present systems and methods for intelligently switching configurations are extremely beneficial.

Figure 1B:
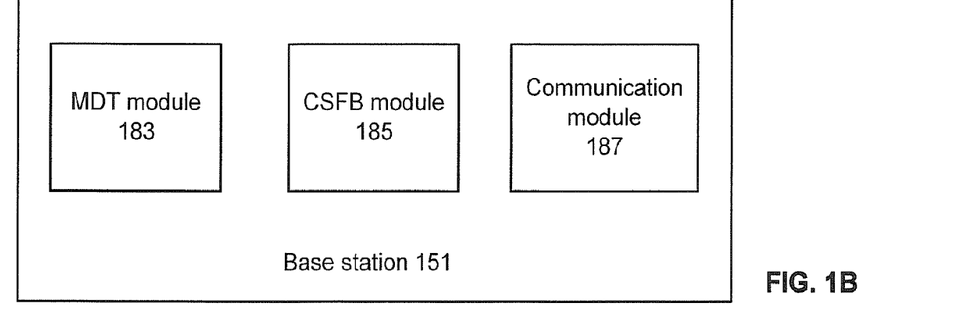
FIG. 1B is a functional block diagram illustrating an example base station device that may be used in connection with various embodiments described herein.

FIG. 1B is a functional block diagram illustrating an example base station device 151 that may be used in connection with various embodiments described herein. The base station device 151 may be similar to the base station 151 described in relationship to base station 151 of FIG. 1A. The base station 151 comprises an MDT module 183, and CSFB module 185, and a communication module 187. The modules collectively may operate to implement the functionality described herein. For example, in one embodiment, the MDT module 183 generates MDT configurations. The MDT module may also be referred to as a test module. The MDT configurations may comprise MDT parameters corresponding to a PS RAT used by the base station 151 or to a CS RAT used by another base station, e.g., the base station 161 of FIG. 1A. The MDT module 183 operates in conjunction with the communication module 187 to transmit the MDT configurations to UEs. Similarly, the MDT module 183 receives reports from UEs containing measured MDT parameters. These reports may be stored or communicated to the mobile network's operator for further analysis and use.

In one embodiment, the CSFB module 185 detects and facilitates the use of CSFB by UEs in communication with the base station 151. The CSFB may also be referred to as a detection module herein. The CSFB module 185 may also communicate with the MDT module 183 in order to facilitate cross-RAT MDT as described herein. For example, in one embodiment, upon detecting the use of CSFB, the CSFB module 185 informs the MDT module 183 of the use. In response, the MDT module 183 generates or retrieves a previously generated MDT configuration corresponding to the RAT to be used during CSFB. This MDT configuration is then sent to the UE via the communication module 187. In this manner, the modules of the base station 151 may cooperate to achieve the advantageous cross-RAT MDT described herein.

Figure 2:
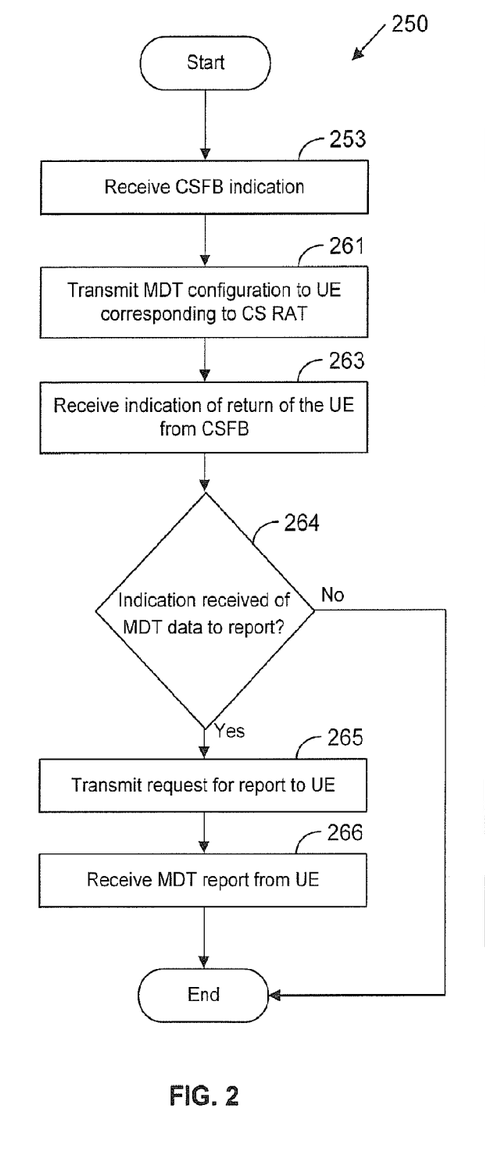
FIG. 2 is a flowchart illustrating an example communication method that can be used in conjunction with various embodiments described herein.

FIG. 2 is a flowchart illustrating an example communication method 250 that can be used in conjunction with various embodiments described herein. The method 250 is performed by a base station such as the base station 151 of FIG. 1A. In particular, the method 250 may be performed, in one embodiment, by a base station using a PS RAT, e.g., LTE, that supports MDT. For ease of explanation, the base station may be referred to as a PS base station. Further, the PS base station is in communication with a UE, such as the UE 171 of FIG. 1A, that supports multiple RATs and MDT. The UE also has the potential to communicate with a separate base station such as the base station 161 of FIG. 1A, using a CS RAT that does not support MDT. For ease of explanation, the separate base station may be referred to as a CS base station. While not shown, it will be appreciated that the PS base station and the UE may engage in MDT corresponding to the PS RAT as described herein. For example, the PS base station may provide a PS MDT configuration to the UE. After the MDT measurements have been taken by the UE, the PS base station can receive a report corresponding to the PS RAT from the UE. In addition, the PS base station and the UE may perform cross RAT MDT. For example, as shown, at step 253, the PS base station receives an indication that CSFB will be used. In one embodiment, the indication is received from the UE when the UE is going to place a voice call. In another embodiment, the indication is received from the core network responsive to an incoming voice call for the UE.

Continuing at step 261, in response to the CSFB indication, the PS base station transmits an MDT configuration to the UE. This MDT configuration corresponds to a second RAT used by the UE during CSFB. In one embodiment, the second RAT is a CS RAT such as GSM. In this manner, the PS base station can specify the parameters that the UE should measure during the period of time it is in communication with the CS base station. Proceeding to step 263, after the CSFB call has been completed, the PS base station receives an indication that the UE intends to return to communication with the PS base station. For example, the UE may request to be connected to the PS base station. In one embodiment, the PS base station reconnects with the UE responsive to the indication. At decision step 264, the PS base station determines if the UE has any MDT measurement data to report. In one embodiment, this determination may comprise receiving an indication from the UE that there is MDT data to report. If the PS base station determines that no MDT data needs to be reported, e.g., if the UE does not transmit an indication of data to report, the method ends. However, if the PS base station determines that there is data to report, the method 250 proceeds to step 265. At step 265, responsive to the indication that the UE has MDT data to report, the PS base station transmits a request to the UE for the measurements. Finally, at step 266, the PS base station receives the MDT report from the UE. The MDT report comprises the MDT measurements taken by the UE while in communication with the CS base station.

Figure 3:
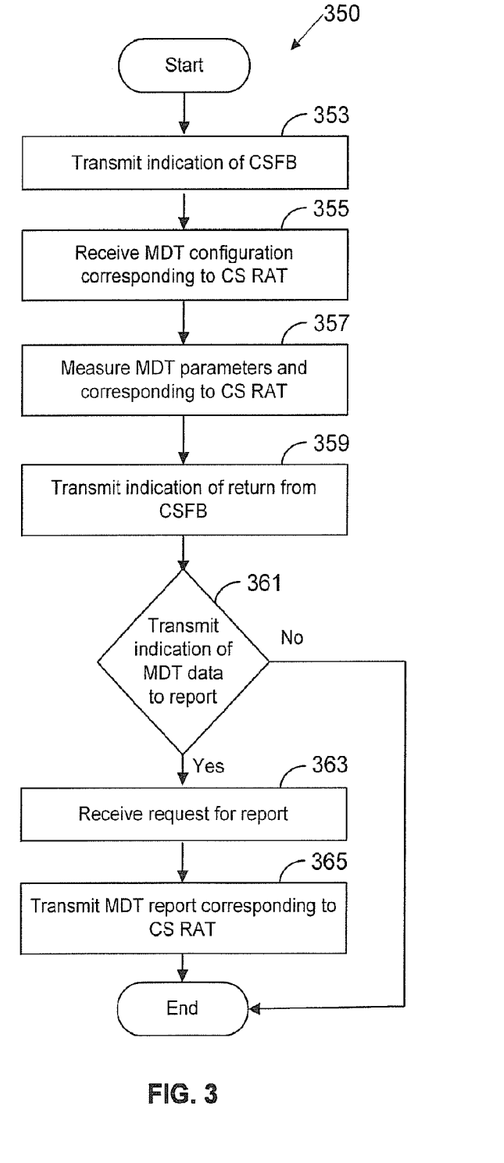
FIG. 3 is a flowchart illustrating another example communication method that can be used in conjunction with various embodiments described herein.

FIG. 3 is a flowchart illustrating an example communication method 350 that can be used in conjunction with various embodiments described herein. The method 350 is performed by a UE, such as the UE 171 of FIG. 1A. In particular, the method 350 may be performed, in one embodiment, by a UE capable of communicating using one or more PS RATs, e.g., LTE, and one or more CS RATs, e.g., UMTS. The UE also supports MDT. The UE can communicate by a PS RAT with a first base station that supports MDT, such as the base station 151 of FIG. 1A. For ease of reference, the first base station may be referred to as a PS base station. The UE can also communicate with a separate base station using a CS RAT that does not support MDT, such as the base station 161 of FIG. 1A. For ease of reference, the separate base station may be referred to as a CS base station. While not shown here, it will be appreciated that the UE and PS base station may operate to perform MDT for the PS RAT as described herein. For example, the UE may receive an MDT configuration from the PS base station corresponding to the PS RAT. The UE may take measurements according to the MDT configuration and then transmit a report to the PS base station that includes the measured data.

In addition, as shown in method 350, cross-RAT MDT may be performed. At step 353, the UE informs the PS base station that it will perform CSFB. In one embodiment, the UE performs this step responsive to receiving input from a user that a voice call should be placed. In another embodiment, the PS base station may transmit a message to the UE indicating an incoming voice call. The UE may perform CSFB in response to this incoming message from the PS base station. Continuing at step 355, in response to the transmitted CSFB indication, the UE receives an MDT configuration from the PS base station. This received MDT configuration corresponds to a CS RAT used by the UE when it communicates with the CS base station. In this manner, the PS base station can specify the parameters that the UE should measure during the period of time it is in communication with a CS base station. Proceeding to step 357, the UE measures the MDT parameters identified in the MDT configuration corresponding to the CS RAT. These parameters may include the MDT parameters described above. Continuing at step 359, after the CSFB call has been completed, the UE transmits an indication to the PS base station indicating that the UE intends to return to communication with the PS base station. At step 361, the UE transmits an indication to the PS base station that it has MDT data to report. At step 363, responsive to the indication of MDT data to report, the UE receives a request for the report. At step 365, the UE transmits the MDT report corresponding to the CS RAT to the PS base station. In one embodiment, if the UE does not perform measurements for the CS RAT MDT configuration, steps 361, 363, and 365 can be omitted.

Figure 4:
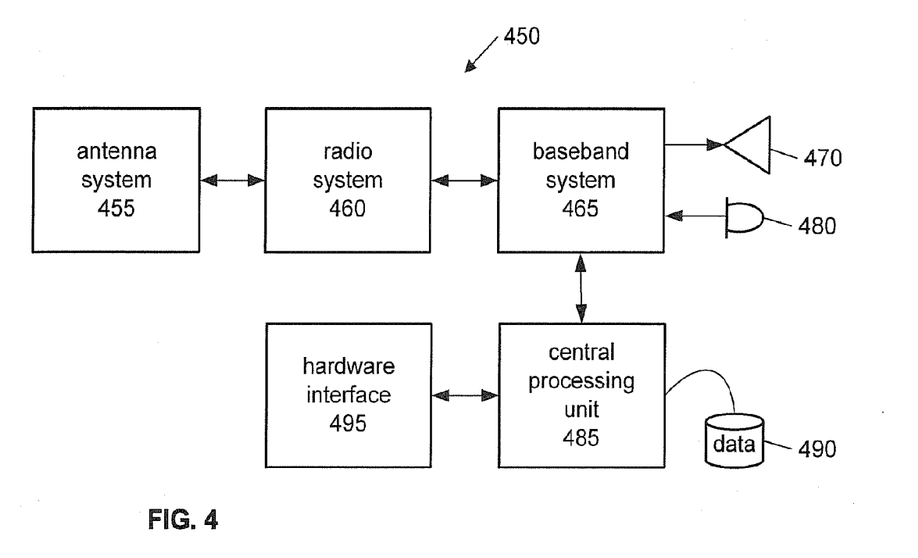
FIG. 4 is a block diagram illustrating an example wireless communication device that may be used in connection with various embodiments described herein.

FIG. 4 is a block diagram illustrating an example wireless communication device 450 that may be used in connection with various embodiments described herein. For example, the wireless communication device 450 may be similar to the UE 171 of FIG. 1 and may implement the functionality described in relation to the UE 171. Similarly, the wireless communication device 450 may be similar to the base stations 151 and 161 of FIG. 1A and may implement the functionality described in relation to the base stations 151 and 161. However, other wireless communication devices and/or architectures may also be used, as will be clear to those skilled in the art.

In the illustrated embodiment, wireless communication device 450 comprises an antenna system 455, a radio system 460, a baseband system 465, a speaker 470, a microphone 480, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) for implementing the functionality described herein.

In this description, the term "computer readable medium" is used to refer to any media used to provide executable instructions (e.g., software and computer programs) to the wireless communication device 450 for execution by the central processing unit 485. Examples of these media include the data storage area 490, microphone 480 (via the baseband system 465), antenna system 455 (also via the baseband system 465), and hardware interface 495. These computer readable media are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 5:
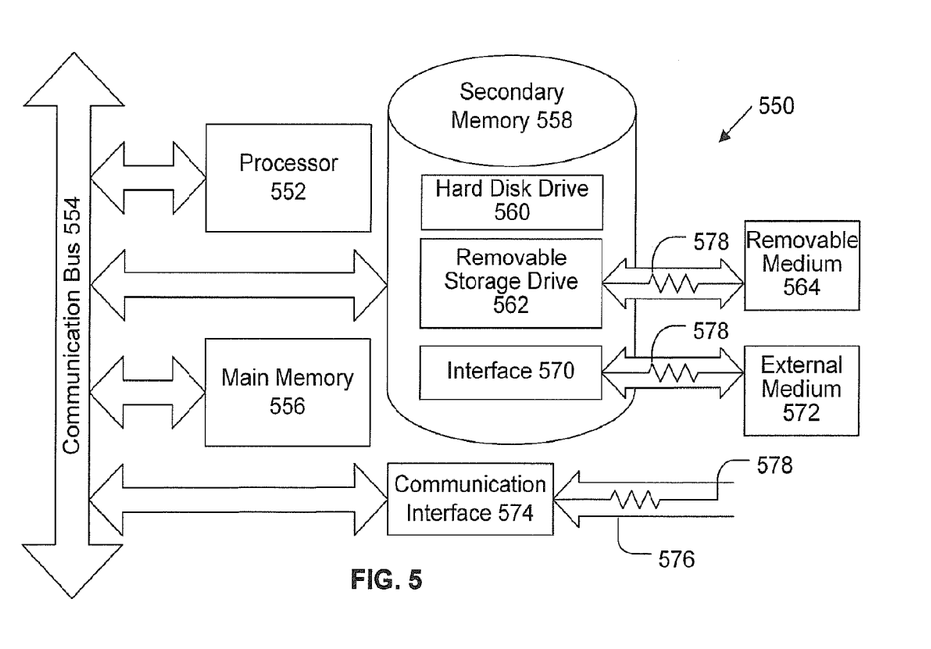
FIG. 5 is a block diagram illustrating an example computer system that may be used in connection with various embodiments described herein.

FIG. 5 is a block diagram illustrating an example computer system 550 that may be used in connection with various embodiments described herein. For example, the computer system 550 may be used in conjunction with the base stations, user equipment, and wireless communication devices described herein. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any non-transitory computer readable storage media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These non-transitory computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A method, implemented in a first base station, for wireless communication between the first base station and a user equipment using a first, packet switched radio access technology, where one or more processors are programmed to perform steps comprising:
   receiving an indication that a user equipment will perform circuit switched fallback and communicate with a second base station using a second, circuit switched radio access technology;
   transmitting, to the user equipment, a first set of parameters to be measured corresponding to the second radio access technology, wherein the step of transmitting is performed responsive to receiving the indication; and
   transmitting, to the user equipment, a second set of parameters to be measured corresponding to the first radio access technology.

2. The method of claim 1, further comprising receiving, from the user equipment, a first set of measurements corresponding to the first set of parameters to be measured.

3. The method of claim 2, further comprising:
   receiving, from the user equipment, a second set of measurements corresponding to the second set of parameters to be measured.

4. The method of claim 1, wherein the indication is received from the user equipment or from the core network.

5. The method of claim 1, wherein the first packet switched radio access technology comprises long term evolution or universal mobile telecommunications system and the second radio access technology comprises global system for mobile communications, universal mobile telecommunications system, or code division multiple access.

6. The method of claim 1, wherein the first set of parameters comprises a minimization of drive test configuration.

7. The method of claim 6, wherein the second base station does not support minimization of drive test.

8. A method, implemented in a user equipment, for wireless communication between the user equipment and a first base station using a first, packet switched radio access technology, where one or more processors are programmed to perform steps comprising:
   transmitting, to the first base station, an indication that the user equipment will perform circuit switched fallback and communicate with a second base station using a second, circuit switched radio access technology;
   receiving, from the first base station, a first set of parameters to be measured corresponding to the second radio access technology, wherein the step of receiving is performed responsive to transmitting the indication; and
   receiving, from the first base station, a second set of parameters to be measured corresponding to the first radio access technology.

9. The method of claim 8, further comprising:
   generating a first set of measurements corresponding to the first set of parameters to be measured; and transmitting, to the first base station, the first set of measurements corresponding to the first set of parameters to be measured.

10. The method of claim 9, further comprising:
generating a second set of measurements corresponding to the second set of parameters to be measured; and
transmitting, to the first base station, the second set of measurements corresponding to the second set of parameters to be measured.

11. The method of claim 8, wherein the first packet switched radio access technology comprises long term evolution or universal mobile telecommunications system.

12. The method of claim 8, wherein the second radio access technology comprises global system for mobile communications, universal mobile telecommunications system, or code division multiple access.

13. The method of claim 8, wherein the first set of parameters comprises a minimization of drive test configuration.

14. The method of claim 13, wherein the second base station does not support minimization of drive test.

15. A technical system for wireless communication, the system comprising:
a non-transitory computer readable medium for storing computer executable programmed modules;
a processor communicatively coupled with the non-transitory computer readable medium for executing programmed modules stored therein;
a communication module stored in the non-transitory computer readable medium and configured to communicate with a UE using a first radio access technology;
a detection module stored in the non-transitory computer readable medium and configured to detect that a user equipment will perform circuit switched fallback using a second radio access technology; and
a test module stored in the non-transitory computer readable medium and configured to transmit a first set of parameters to be measured to the user equipment responsive to detection, wherein the first set of parameters corresponds to the second radio access technology, the test module further configured to transmit, to the user equipment, a second set of parameters to be measured corresponding to the first radio access technology.

16. The technical system for wireless communication of claim 15, wherein the test module is further configured to receive a first set of measurements corresponding to the first set of parameters to be measured.

17. The technical system for wireless communication of claim 16, wherein the test module is further configured to:
receive, from the user equipment, a second set of measurements corresponding to the second set of parameters to be measured.

18. The technical system for wireless communication of claim 15, wherein the first radio access technology comprises long term evolution.

19. The technical system for wireless communication of claim 15, wherein the second radio access technology comprises global system for mobile communications, universal mobile telecommunications system, or code division multiple access.

20. The technical system for wireless communication of claim 15, wherein the first set of parameters comprises a minimization of drive test configuration and wherein the second radio access technology does not support minimization of drive test.

\* \* \* \* \*